(12) United States Patent
Zhu et al.

(10) Patent No.: US 12,487,442 B2
(45) Date of Patent: Dec. 2, 2025

(54) COMPOSITE PRISM BASED ON ISOSCELES PRISM, AND LASER RANGING TELESCOPE COMPRISING COMPOSITE PRISM

(71) Applicant: CHONGQING HYLON CO., LTD, Chongqing (CN)

(72) Inventors: Jie Zhu, Chongqing (CN); Mingxiao Gao, Chongqing (CN)

( * ) Notice: Subject to any disclaimer, the term of this patent is extended or adjusted under 35 U.S.C. 154(b) by 339 days.

(21) Appl. No.: 18/044,566

(22) PCT Filed: Sep. 10, 2020

(86) PCT No.: PCT/CN2020/114580
§ 371 (c)(1),
(2) Date: Mar. 8, 2023

(87) PCT Pub. No.: WO2022/052000
PCT Pub. Date: Mar. 17, 2022

(65) Prior Publication Data
US 2023/0359014 A1    Nov. 9, 2023

(51) Int. Cl.
*G02B 23/04* (2006.01)
*G01C 3/04* (2006.01)
*G01S 17/08* (2006.01)
*G02B 5/04* (2006.01)
*G02B 27/10* (2006.01)

(52) U.S. Cl.
CPC .............. *G02B 23/04* (2013.01); *G01C 3/04* (2013.01); *G01S 17/08* (2013.01); *G02B 5/04* (2013.01); *G02B 27/10* (2013.01); *G02B 27/1006* (2013.01)

(58) Field of Classification Search
None
See application file for complete search history.

(56) References Cited

U.S. PATENT DOCUMENTS

| | | | |
|---|---|---|---|
| 11,320,643 B2* | 5/2022 | Zhu | G02B 17/045 |
| 2013/0283662 A1* | 10/2013 | Hu | F41G 1/35 |
| | | | 42/114 |
| 2015/0370077 A1* | 12/2015 | Zuo | G02B 27/145 |
| | | | 359/638 |
| 2020/0088987 A1* | 3/2020 | Zhu | G02B 17/045 |
| 2020/0150227 A1* | 5/2020 | Qian | G01S 7/4813 |
| 2020/0341261 A1* | 10/2020 | Qian | G02B 17/04 |

* cited by examiner

*Primary Examiner* — Derek S. Chapel
(74) *Attorney, Agent, or Firm* — Novoclaims Patent Services LLC; Mei Lin Wong

(57) ABSTRACT

A composite prism based on an isosceles prism and a laser ranging telescope includes a first prism, a second prism, a third prism and a compensating prism. The first prism is an isosceles prism with three reflecting surfaces, the second prism is a roof prism, the third prism is a half-penta prism, and the compensating prism is a wedge prism. Through the composite prism, a telescope observation system, a laser emission system, a laser receiving system and a sighting and display system are reasonably integrated, so that a telescope features diversified performance and structural style, small size and convenient to carry.

14 Claims, 2 Drawing Sheets

COMPOSITE PRISM BASED ON ISOSCELES PRISM, AND LASER RANGING TELESCOPE COMPRISING COMPOSITE PRISM

BACKGROUND OF THE PRESENT INVENTION

The present invention relates to the field of telescopic ranging, and particularly relates to a composite prism based on an isosceles prism and a laser ranging telescope using the same.

DESCRIPTION OF RELATED ARTS

Existing telescopes are not merely a fashionable consumer good for telescopic observation. Some telescopes also have the functions of emitting laser rapidly to determine target distance, target velocity and the like, and have become a kind of indispensable measuring tool. Patent applications with Publication No. CN105806308A and CN107219621A disclose a binocular ranging telescope. First prisms in a combination of prisms all have only two reflecting surfaces, so that the transmission direction of a beam decided thereby is harmful to installation of laser emission and laser receiving devices and a projection device. It is hard to install the laser emission and laser receiving devices on the side of the telescope close to the middle axis, which restricts the diversity of the structural styles and functions of the ranging telescope.

SUMMARY OF THE PRESENT INVENTION

In order to obtain a ranging telescope featuring compact structure, small size and diversified functions and structural styles, the present invention provides a composite prism based on an isosceles prism and a laser ranging telescope using the same.

To achieve the objective, the present invention uses the technical solution as follows:

A composite prism based on an isosceles prism, including a first prism, a second prism, a third prism, wherein the first prism is the isosceles prism with three reflecting surfaces, and the second prism is a roof prism; the third prism is a half-penta prism; a third surface III of the third prism is glued with a third surface I of the first prism, a beam splitting film is coated to the glued surface, light with first wavelength enters from a first surface I of the first prism, is emitted from a second surface I of the first prism after being reflected by the second surface I, the third surface I and the first surface I of the first prism successively, enters a first surface II of the second prism, and is emitted from a third surface II after being reflected by a roof surface and the first surface II of the second prism.

Further, in the above solution, the composite prism further includes a compensating prism, wherein a second surface IV of the compensating prism is glued with a second surface III of the third prism, and a beam splitting film is coated to the glued surface; and light with second wavelength enters from the first surface I of the first prism, penetrates through the third surface I o enter the third prism after being reflected by the second surface I of the first prism, and is then emitted from the first surface III of the third prism after being reflected by the second surface III of the third prism.

The light with second wavelength enters from the first surface III of the third prism, enters the first prism through the third surface III after being reflected by the second surface III of the third prism, and is emitted from the first surface I of the first prism after being reflected by the second surface I of the first prism.

Further, the compensating prism provided by the present invention can also be arranged in such a manner that the second surface IV of the compensating prism is glued with the third surface I of the first prism, and the first surface IV of the compensating prism is glued with the third surface III of the third prism, so that the glued surface of the compensating prism and the third prism becomes a plane perpendicular to a beam with second wavelength.

A laser ranging telescope using the above composite prism, further including an eye lens, an objective lens, a laser device, a laser receiver, and a projection device. The laser device and the laser receiver are arranged on a light path of the light with second wavelength entering/being emitted from the third prism.

The objective lens, the composite prism and the eye lens form the telescope. The laser device, the composite prism and the objective lens form a laser emission system. The objective lens, the composite prism and the laser receiver form a laser receiving system. The projection device includes a reflector and a lens. The display is disposed on the side surface of the first prism.

The display is configured to display a graduated pattern and measuring information of the laser ranging telescope. Light with third wavelength emitted by the display penetrates through the lens after being reflected by the first reflector, then enters the compensating lens of a lens cone on the right side after being reflected by the second reflector, then penetrates through the compensating lens and the third prism to enter the first prism, is imported into a beam with first wavelength of the first prism and finally forms an image of the display in a position of a focal plane of the objective lens of the lens cone on the right side.

The light with first wavelength from an object enters the telescope, and being erected by the composite prism, the object is imaged in the position of the focal plane of the objective lens. The image of the object in the lens cone on the right side is overlapped with the image of the display. Through amplification by the eye lens, telescopic observation and sighting for the object are achieved.

The light with second wavelength from the laser device enters the laser emission system from the first surface III of the third prism. The light collimated by the objective lens is emitted to the object sighted by the telescope.

The light with second wavelength reflected by the sighted object is gathered by an objective lens in another cone lens to enter the laser receiving system. The laser ranging telescope calculates a subject distance according to a process from emitting laser to the object to receiving the laser, and displays related information through the above display.

When the laser ranging telescope does not use the projection device, a graduating display lens can be arranged between the eye lens and the composite prism. The graduating display lens is a transmission type LCD or OLED. The display of the projection device is replaced by the illumination light source to illuminate the LCD graduating display lens at night.

The compensating prism is glued between the first prism and the third prism, and the beam splitting film which reflects the light with first wavelength and transmits the light with second and third wavelengths is coated to the glued surface of the compensating prism and the first prism. The glued surface of the compensating prism and the third prism becomes a plane perpendicular to a beam with second wavelength. The third prism and the compensating prism can be made from different glass materials. The second surface III of the third prism becomes a non-glued surface without being coated with the reflecting film or the beam splitting film, so that the transmission efficiency of the light with second wavelength can be further improved.

In an optical system of the laser ranging telescope, the composite prism based on an isosceles prism integrates a telescope observation system, a laser emission system, a laser receiving system and a sighting and display system reasonably, so that the laser device and the laser receiver both can be mounted on the side close to the middle axis of the telescope, and therefore, the performance and structural style of the laser ranging telescopic are diversified, and the size is reduced.

DETAILED DESCRIPTION OF THE PREFERRED EMBODIMENT

Figure 1:
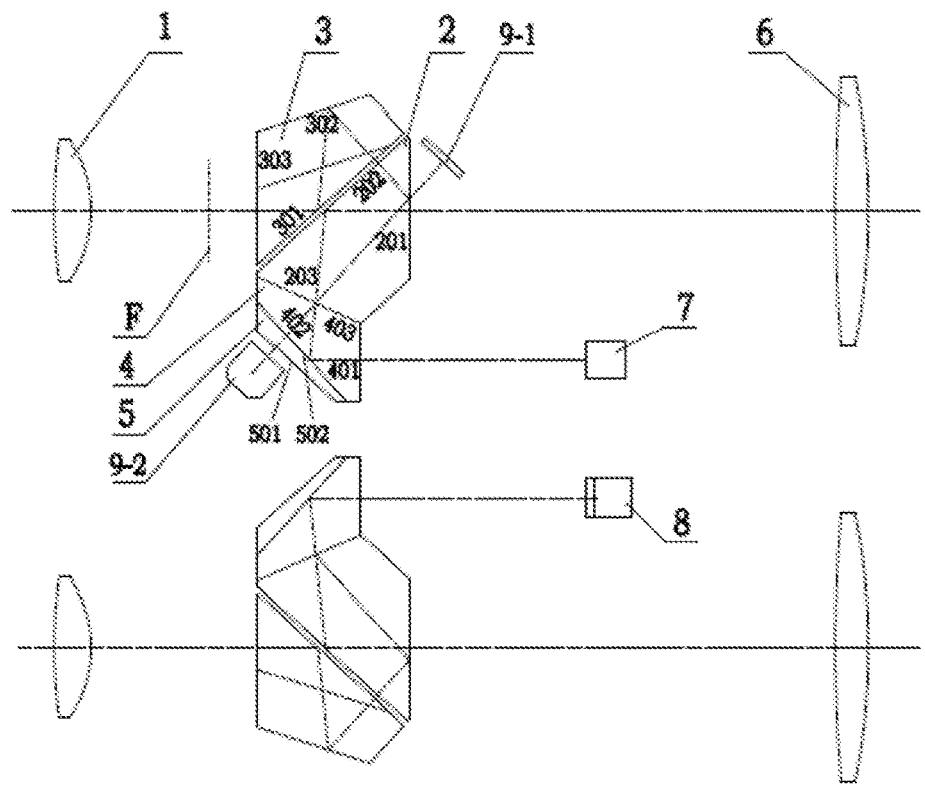
FIG. 1 is a schematic diagram of an optical system of a binocular laser ranging telescope in the present invention.
Figure 2:
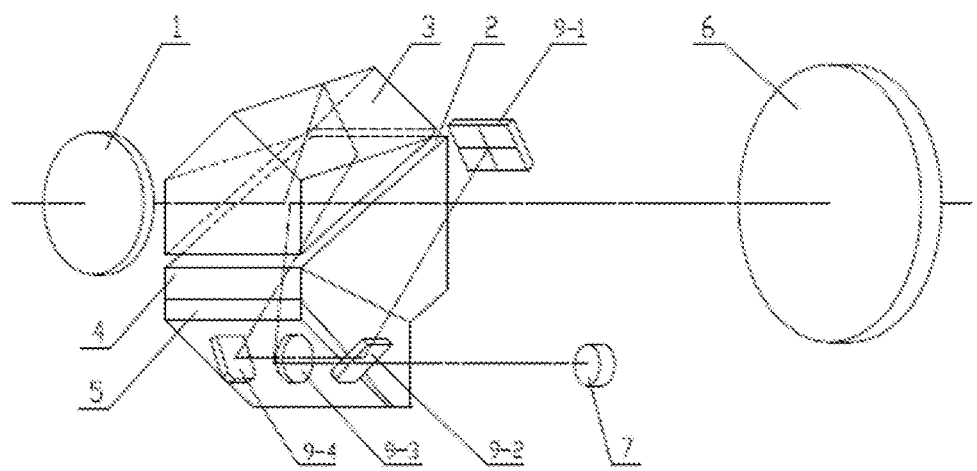
FIG. 2 is a schematic diagram of a composite prism and a projection device in the present invention.

Embodiment 1: shown in FIG. 1 and FIG. 2. A binocular ranging telescope includes two objective lenses 6, two eye lenses 1, two composite prisms, a laser device 7, a laser receiver 8 and a projection device. They are combined to form an optical system of a binocular ranging telescope through the composite prism.

The composite prism includes a first prism 2, a second prism 3, a third prism 4 and a compensating prism 5, wherein the first prism 2 is an isosceles prism, the second prism 3 is a roof prism, the third prism 4 is a half-penta prism, and the compensating prism 5 is a wedge prism. A third surface III 403 of the third prism 4 is glued with a third surface I 203 of the first prism 2, and a beam splitting film which reflects light with first wavelength and transmits light with second wavelength and light with third wavelength is coated to the glued surface. A second surface IV 502 of the compensating prism 5 is glued with a second surface III 402 of the third prism 4, and a beam splitting film which reflects light with second wavelength and transmits light with third wavelength is coated to the glued surface. A first surface IV 501 of the compensating prism 5 is perpendicular to the optical axis of a beam with third wavelength.

The objective lens, the composite prism and the eye lens form a monocular telescope. Two monocular telescopes are parallel and are connected through the middle axis, so that the optical axes of the two lens cones area parallel to form the binocular telescope. In one of the lens cone, the laser device, the composite prism and the objective lens form a laser emission system, and the laser emission system and the telescope share the composite prism and the objective lens. In the other lens cone, the objective lens, the composite prism and the laser receiver form the laser receiving system, and the laser receiving system and the monocular telescope share the objective lens and the composite prism. The projection device includes a display 9-1, a first reflector 9-2, a second reflector 9-4 and a lens 9-3. The first reflector 9-2, the second reflector 9-4 and the lens 9-3 are disposed at the bottom of the composite prism of the right lens cone, and the display 9-1 is disposed on the side surface of the composite prism of the right lens cone.

Light with third wavelength emitted by the display 9-1 of the projection device penetrates through the lens 9-3 after being reflected by the first reflector 9-2, then enters the compensating lens 5 of the lens cone on the right side after being reflected by the second reflector 9-4, then penetrates through the compensating lens 5 and the third surface III 403 of the third prism 4 to enter the first prism 2, is imported into a beam with first wavelength of the first prism 2 and finally forms an image of the display in a position (position shown by F in FIG. 1) of a focal plane of the objective lens of the lens cone on the right side. The image contains a graduating pattern of the laser ranging telescope and a pattern for displaying measuring information.

The light with first wavelength from an object enters the telescope 6, then enters the first surface I 201 of the first prism 2, is emitted from the second surface I 202 thereof after being reflected by the second surface I 202 and the third surface I 203 of the first prism 2 and the first surface I 201 thereof, then enters the second prism 3, and is emitted from the third surface II 303 after being reflected by the roof surface 302 and the first surface II 301 of the second prism in sequence to image the object to the focal plane of the objective lens, and the image of the object is overlapped with the image of the display in the lens cone on the right side. Through amplification by the eye lens, telescopic observation and sighting for the object are achieved.

The light with second wavelength from the laser device enters from the first surface III 401 of the third prism 4, enters the first prism 2 through the third surface III 403 after being reflected by the second surface III 402 of the third prism 4, is emitted from the first surface I 201 of the prism after being reflected by the second surface I 202 of the first prism 2, and is collimated by the objective lens and is emitted to the object sighted by the telescope.

The light with second wavelength reflected by the sighted object is gathered by the objective lens of the other lens cone and enters from the first surface I 202 of the first prism 2, penetrates through the third surface I 203 to enter the third prism 4 after being reflected by the second surface I 202 of the first prism 2, is reflected by the second surface III 402 of the third prism, and is emitted from the first surface III 401 of the prism to enter the laser receiver. The laser ranging telescope calculates a subject distance according to a process from emitting laser to the object to receiving the laser, and displays the measuring information through the above display. The projection image of the display is then observed by the eye lens to acquire the related information.

Figure 3:
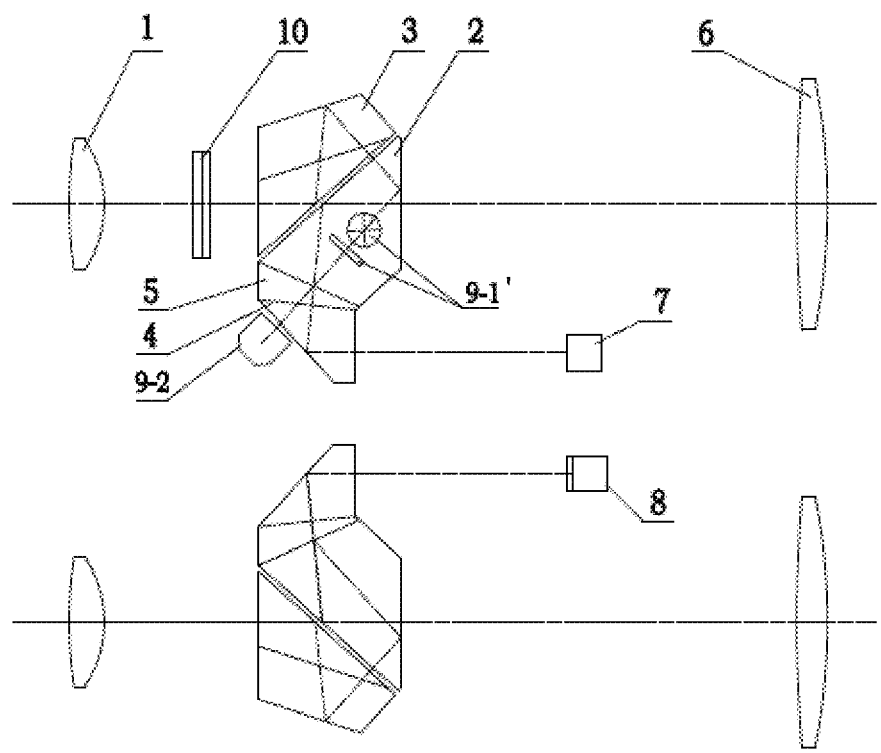
FIG. 3 is a schematic diagram of the optical system of the binocular laser ranging telescope enabling an LCD graduating display lens.

Embodiment 2: as shown in FIG. 3, in the laser ranging telescope, a graduating display lens 10 is arranged between an eye lens 1 and a composite prism. The graduating display lens 10 is a transmission type LCD graduating display lens or an OLCD graduating display lens which is mounted on the focal plane of an objective lens.

A second surface IV 502 of the compensating prism 5 in the composite prism is glued with a third surface I 203 of the first prism 2, and a beam splitting film which reflects light with first wavelength and transmits light with second wavelength and light with third wavelength is coated to the glued surface. A first surface IV 501 of the compensating prism 5 is glued with a third surface III 403 of the third prism 4, and the glued surface is perpendicular to a beam with second wavelength. The third prism 4 and the compensating prism 5 can be made from different glass materials.

At the time, after the display is replaced by an illumination light source 9-1', a projection device is turned into an illumination device. Light with third wavelength emitted by the illumination light source 9-1' penetrates through the lens 9-3 after being reflected by the first reflector 9-2, enters the third prism 4 after being reflected by the second reflector 9-4, then penetrates through the compensating prism 5 to enter the first prism 2 and is imported into the beam with first wavelength of the first prism 2, so as to provide night illumination for the LCD graduating display lens.

The light with first wavelength from an object enters the telescope 6, then enters the first surface I 201 of the first prism 2, is emitted from the second surface I 202 thereof after being reflected by the second surface I 202 and the third surface I 203 of the first prism 2 and the first surface I 201 thereof, then enters the second prism 3, and is emitted from the third surface II 303 after being reflected by the roof surface 302 and the first surface II 301 of the second prism in sequence to image the object to the focal plane of the objective lens. The image of the object in the lens cone on the right side is overlapped with the graduating display lens. Through amplification by the eye lens, telescopic observation and sighting for the object are achieved.

The light with second wavelength from the laser device enters from the first surface III 401 of the third prism 4, enters the compensating prism 5 through the third surface III 403 after being reflected by the second surface III 402 of the third prism 4, penetrates through the compensating prism 5 to enter the first prism 2, is emitted from the first surface I 201 of the prism after being reflected by the second surface I 202 of the first prism 2, and is collimated by the objective lens and is emitted to the object sighted by the telescope.

The light with second wavelength reflected by the sighted object is gathered by the objective lens of the other lens cone and enters from the first surface I 202 of the first prism 2, penetrates through the third surface I 203 to enter the compensating prism 5 after being reflected by the second surface I 202 of the first prism 2, penetrates through the compensating prism 5 to enter the third prism 4, and is emitted from the first surface III 401 of the prism to enter the laser receiver after being reflected by the second surface III 402 of the third prism.

The laser ranging telescope calculates a subject distance according to a process from emitting laser to the object to receiving the laser, and displays the measuring information on the graduating display lens. The projection image of the graduating display lens is then observed by the eye lens to acquire the related information.

Figure 4:
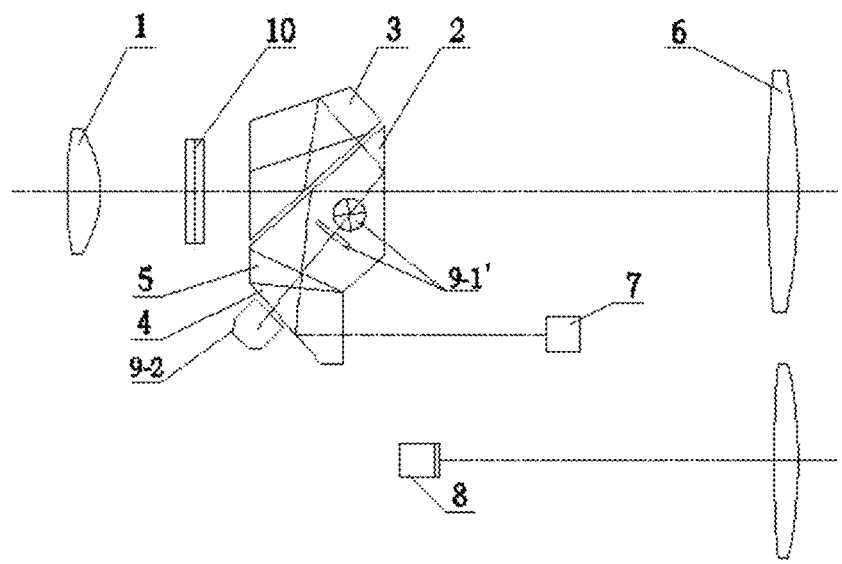
FIG. 4 is a schematic diagram of the optical system of a monocular laser ranging telescope.

Embodiment 3: FIG. 4 shows an optical system of a monocular laser ranging telescope. The present invention is suitable for the technology of the binocular laser ranging telescope, which is suitable for the monocular laser ranging telescope.

What is claimed is:

1. A composite prism based on an isosceles prism, comprising a first prism (2), a second prism (3), a third prism (4), wherein the first prism (2) is an isosceles prism having a first surface I (201), a second surface I (202) and a third surface I (203), the second prism (3) is a roof prism having a first surface II (301), a roof surface (302) and a a third surface II (303); the third prism (4) is a half-penta prism having a third surface III (403) glued with the third surface I (203) of the first prism (2), a beam splitting film is coated to between the third surface III (403) and the third surface I (203), light with a first wavelength enters from the first surface I (201) of the first prism (2), sequentially passes through and reflects through the second surface I (202) of the first prism (2), the third surface I (203) and the first surface I (201) of the first prism (2) the emits from the second surface I (202) of the first prism (2) and enters the first surface II (301) of the second prism (3), being reflected by the roof surface (302) and the first surface II (301) of the second prism (3) and is finally emitted from the third surface II (303).

2. The composite prism based on an isosceles prism according to claim 1, further comprising a compensating prism (5) having a second surface IV (502) glued with a second surface III (402) of the third prism (4), and a second beam splitting film is coated to the glued surface between the second surface IV (502) of the compensating prism (5) and second surface III (402) of the third prism (4); and light with a second wavelength enters from the first surface I (201) of the first prism (2), penetrates through the third surface I (203) to enter the third prism (4) after being reflected by the second surface I (202) of the first prism (2), and is then emitted from the first surface III (401) of the third prism (4) after being reflected by the second surface III (402) of the third prism (4).

3. The composite prism based on an isosceles prism according to claim 2, wherein the light with second wavelength enters from the first surface III (401) of the third prism (4), enters the first prism (2) through the third surface III (403) after being reflected by the second surface III (402) of the third prism (4), and is emitted from the first surface I (201) of the first prism (2) after being reflected by the second surface I (202) of the first prism (2).

4. A laser ranging telescope, comprising the composite prism according to claim 3, an eye lens (1), an objective lens (6), a laser device (7) and a laser receiver (8), wherein the laser device (7) and the laser receiver (8) are arranged on a light path of the light with the second wavelength entering/being emitted from the third prism (4).

5. The laser ranging telescope according to claim 4, further comprising a projection device, wherein the projection device comprises a display (9-1), a first reflector (9-2), a lens (9-3) and a second reflector (9-4); light with a third wavelength emitted by the display (9-1) penetrates through the lens (9-3) after being reflected by the first reflector (9-2), then enters the compensating lens (5) through the second reflector (9-4), then penetrates through the compensating lens (5) and the third prism (4) to enter the first prism (2), merges into a beam with the first wavelength of the first prism (2) and finally forms an image at a position between the composite prism and the eye lens (1).

6. A laser ranging telescope, comprising the composite prism according to claim 2, an eye lens (1), an objective lens (6), a laser device (7) and a laser receiver (8), wherein the laser device (7) and the laser receiver (8) are arranged on a light path of the light with the second wavelength entering/being emitted from the third prism (4).

7. The laser ranging telescope according to claim 6, further comprising a projection device, wherein the projection device comprises a display (9-1), a first reflector (9-2), a lens (9-3) and a second reflector (9-4); light with a third wavelength emitted by the display (9-1) penetrates through the lens (9-3) after being reflected by the first reflector (9-2), then enters the compensating lens (5) through the second reflector (9-4), then penetrates through the compensating lens (5) and the third prism (4) to enter the first prism (2), merges into a beam with the first wavelength of the first prism (2) and finally forms an image at a position between the composite prism and the eye lens (1).

8. A composite prism based on an isosceles prism, comprising a first prism (2), a second prism (3), a third prism (4), and a compensating prism (5), wherein the first prism (2) is an isosceles prism, the second prism (3) is a roof prism; the compensating prism (5) has a second surface IV (502) glued with a third surface I (203) of the first prism (2), and a beam splitting film is coated to the glued surface between the second surface IV (502) of the compensating prism (5) and the third surface I (203) of the first prism (2), and the compensating prism (5) has a first surface IV (501) glued with a third surface III (403) of the third prism (4), and the glued surface between the first surface IV (501) of the compensating prism (5) and the third surface III (403) of the third prism (4) is perpendicular to an optical axis of a beam with a second wavelength;

light with a first wavelength enters from a first surface I (201) of the first prism (2), is emitted from a second surface I (202) of the first prism (2) after being reflected by the second surface I (202), the third surface I (203) and the first surface I (201) of the first prism (2) successively, enters a first surface II (301) of the second prism (3), and is emitted from a third surface II (303) after being reflected by a roof surface (302) and the first surface II (301) of the second prism (3);

light with the second wavelength enters from the first surface I (201) of the first prism (2), penetrates through the third surface I (203) to enter the compensating prism (5) after being reflected by the second surface I (202) of the first prism (2), penetrates through the compensating prism (5) to enter the third prism (4) from the third surface III (403) of the third prism (4), and is then emitted from the first surface III (401) of the third prism (4) after being reflected by the second surface III (402) of the third prism;

or/and the light with the second wavelength enters from the first surface III (401) of the third prism (4), enters the first prism (2) through the third surface III (403) after being reflected by the second surface III (402) of the third prism (4), and is emitted from the first surface I (201) of the first prism (2) after being reflected by the second surface I (202) of the first prism (2).

9. A laser ranging telescope, comprising the composite prism according to claim 8, an eye lens (1), an objective lens (6), a laser device (7) and a laser receiver (8), wherein the laser device (7) and the laser receiver (8) are arranged on a light path of the light with the second wavelength entering/being emitted from the third prism (4).

10. The laser ranging telescope according to claim 9, further comprising a graticule display (10) arranged between the eye lens (1) and the composite prism.

11. The laser ranging telescope according to claim 10, wherein the graticule display (10) is a transmissive type Liquid Crystal Diode (LCD) display or an Organic Light-Emitting Diode (OLED) display.

12. The laser ranging telescope according to claim 11, an illumination light source (9-1'), a first reflector (9-2), a lens (9-3) and a second reflector (9-4) to form an illumination device; light emitted by the illumination light source (9-1') penetrates through the lens (9-3) after being reflected by the first reflector (9-2), enters the third prism (4) after being reflected by the second reflector (9-4), then penetrates through the compensating prism (5) to enter the first prism (2) and is merged into the beam with the first wavelength of the first prism (2), so as to provide night illumination for the LCD graticule display.

13. The laser ranging telescope according to claim 10, further comprising an illumination light source (9-1'), a first reflector (9-2), a lens (9-3) and a second reflector (9-4) to form an illumination device; light emitted by the illumination light source (9-1') penetrates through the lens (9-3) after being reflected by the first reflector (9-2), enters the third prism (4) after being reflected by the second reflector (9-4), then penetrates through the compensating prism (5) to enter the first prism (2) and is merged into the beam with the first wavelength of the first prism (2), so as to provide night illumination for the graticule display (10).

14. The laser ranging telescope according to claim 9, further comprising an illumination light source (9-1'), a first reflector (9-2), a lens (9-3) and a second reflector (9-4) to form an illumination device; light emitted by the illumination light source (9-1') penetrates through the lens (9-3) after being reflected by the first reflector (9-2), enters the third prism (4) after being reflected by the second reflector (9-4), then penetrates through the compensating prism (5) to enter the first prism (2) and is merged into the beam with first wavelength of the first prism (2), so as to provide night illumination for the LCD graticule display.

* * * * *